June 17, 1958    C. F. DESMOND ET AL    2,839,124
MULTI-MOTION SEAT ADJUSTER WITH MULTIPLE DRIVE MOTORS
Filed Jan. 16, 1956      4 Sheets-Sheet 2

Inventors
CHARLES F. DESMOND
EDMUND E. BARMASSE
by
Attys.

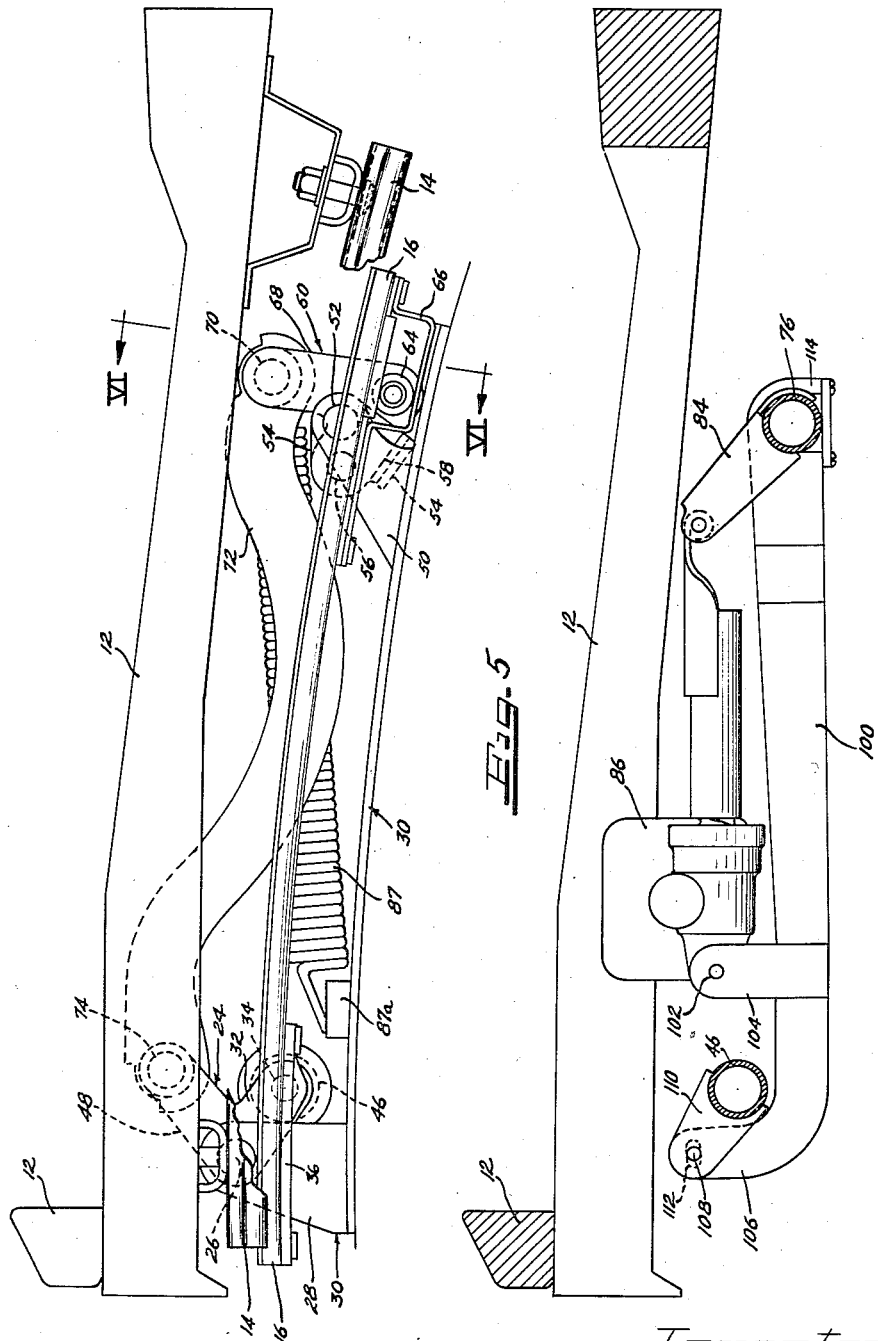

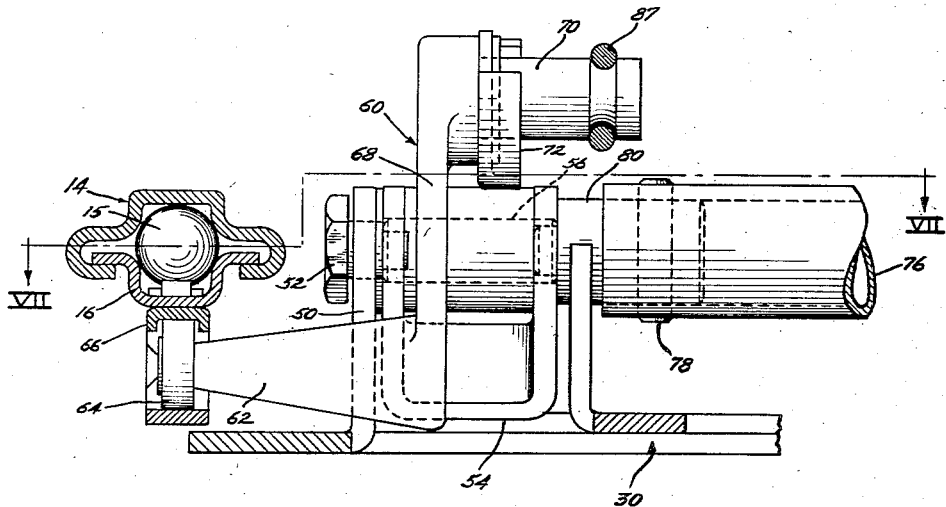
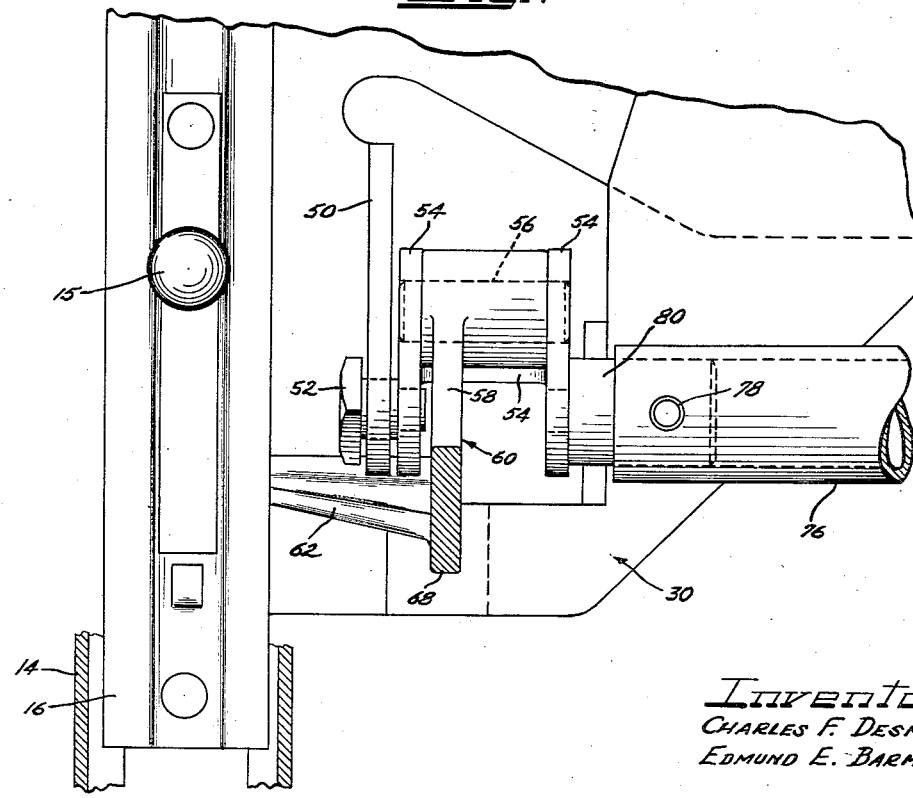

United States Patent Office 2,839,124
Patented June 17, 1958

2,839,124

MULTI-MOTION SEAT ADJUSTER WITH MULTIPLE DRIVE MOTORS

Charles F. Desmond, Williamsville, and Edmund E. Barmasse, Buffalo, N. Y., assignors to Houdaille Industries, Inc., Detroit, Mich., a corporation of Michigan Application January 16, 1956, Serial No. 559,472

8 Claims. (Cl. 155—14)

This invention relates generally to a power operated mechanism for adjustably positioning a movable seat such as the front seat of an automotive vehicle, and more particularly relates to an improved actuating mechanism adapted to provide a multiplicity of seat-adjustment movements.

It is an object of the present invention to provide new and improved means for providing controlled seat-adjustment in a multiplicity of movements relative to the base structure, selectively operable at the will of the operator.

It is another object to provide means for effecting fore-and-aft seat extension, up-and-down vertical seat-translation, and recline-or-tip seat-tilting movement, operable either independently or concurrently, to selectively effect forward movement, rearward movement, upward movement, downward movement, rearward recline, and forward tipping positions of seat-adjustment.

Another object of the present invention is to provide a seat-adjustment having longitudinally spaced seat-supporting means or systems adapted to be operated in an interrelated manner to provide elevation adjustment for the seat, but with one of the supporting means being operable independently of the other to effect a tilt adjustment of the seat.

A further object is to provide mechanism for effecting such seat-adjustment, which is fairly simple and economical in its construction, manufacture, and assembly, which will be effective to accomplish its intended functions, and which will give reliable and trouble-free performance over a prolonged period of time.

These and other objects, features, and advantages of the present invention will be readily apparent from the following description of an exemplary preferred embodiment thereof, taken in conjunction with the accompanying drawings, in which:

Figure 4 is a somewhat diagrammatic side elevational view of the structure shown in Figure 1, viewed from the left of the seat, as indicated generally by the line IV—IV of Figure 1, some portions omitted or broken away for clarity;

Figure 5 is a somewhat diagrammatic longitudinal vertical section, taken generally along the line V—V of Figure 1, portions of the structure being omitted for clarity;

Figure 6 is a transverse, vertical fragmental section, taken generally along the line VI—VI of Figure 4, illustrating seat elevation and seat-tilt details; and Figure 7 is a horizontal section taken substantially along the line VII—VII of Figure 6.

As shown on the drawings:

Figure 1:
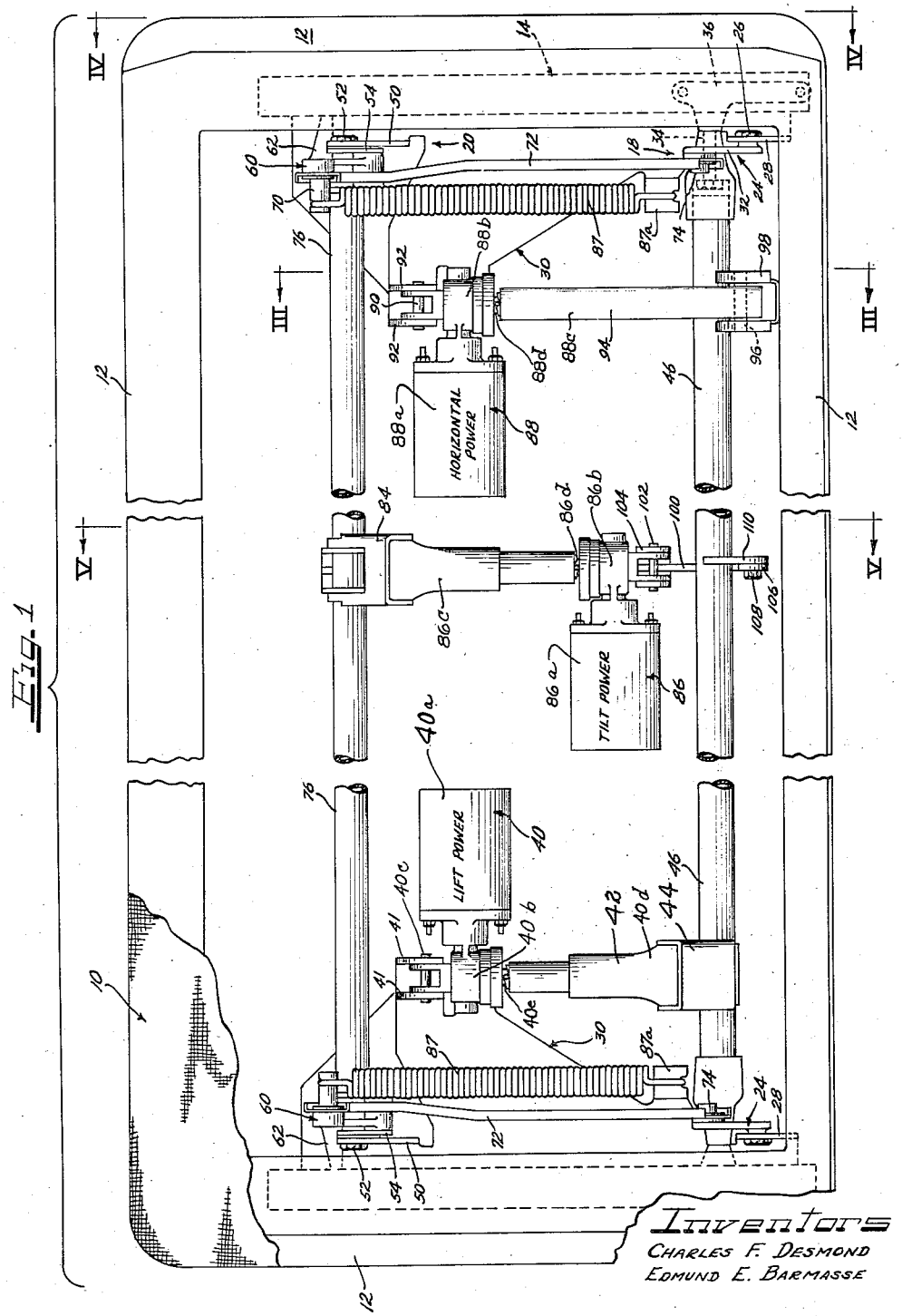
Figure 1 is a top plan view of a seat frame of an automotive vehicle generally illustrating the seat-adjustment mechanism according to a preferred embodiment of the present invention.
Figure 2:
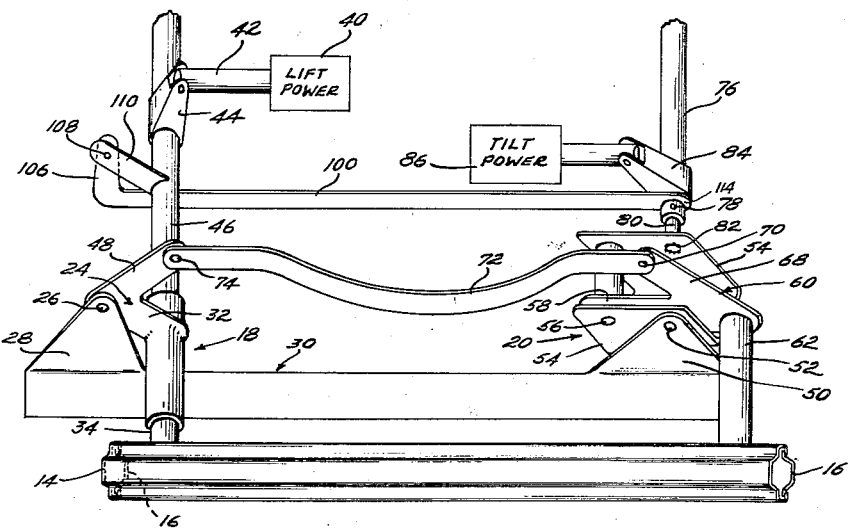
Figure 2 is a perspective view illustrating diagrammatically portions of the mechanism shown in Figure 1, particularly indicating tilt mechanism and elevation mechanism.
Figure 3:
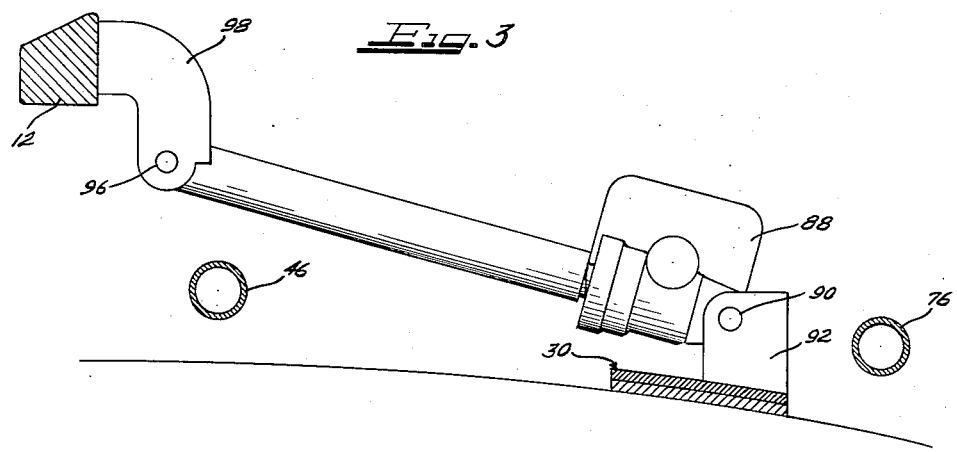
Figure 3 is a somewhat diagrammatic vertical, longitudinal section, taken generally along the line III—III of Figure 1 to show horizontal movement means, portions of the structure being omitted for clarity.

A seat 10 having a frame 12 is supported from an associated base structure such as the car floor by a pair of laterally spaced members such as upper tracks 14 which support the seat for controlled movement, providing fore-and-aft horizontal seat-extension, up-and-down vertical seat-translation, or recline-or-tip seat-tilting movement. For purposes of the fore-and-aft extension movement or seat-reciprocation as will be described hereinafter, the tracks 14 are longitudinally extending members which co-operate with and are relatively slidably supported through balls 15 by lower track members 16 for fore-and-aft reciprocation therealong. The lower track-members 16 are in turn supported by a supporting system now to be described which is operative to support those lower tracks and to impart to them selectively either a vertical translation, or tilt, or both.

The supporting system here provided for supporting the lower-tracks 16 generally comprises relatively spaced forward and rearward supporting means 18 and 20. Each is adapted by means yet to be described to vary the elevation at which it supports the lower track 16 with respect to the base structure; and the operation of both is interrelated in a co-operating supporting system to provide variable elevation of the tracks 16 and hence also of the seat frame 12 and seat 10.

Moreover, one of those spaced supporting means, here shown as the rear support 20, is adapted to vary the elevation of that portion of the supporting trackways 16 it carries, not only with respect to the base structure but also with respect to the other supporting means 18 thereby to effect a variable tilt of the tracks 16 and hence also of the seat frame 12 and seat 10.

It should be noted that the means for supporting the seat 10 is generally symmetrical with respect to the left-hand and right-hand sides of the seat, so for the most part only those features at one side of the seat will be described.

The vertically elevatable support 18 for the forward portion of the lower track 16 as shown includes a movable member such as a rotatable bell crank member 24 supported as shown by pivot means 26 from an upstanding ear 28 of a bracket 30 mounted to the vehicle floor. An arm 32 of bell crank 24 is pivoted on a transversely extending stud 34 carried by a bracket 36 secured to the lower track so that movement of the bell crank 24 as now to be explained will act to control the elevation of the front portion of the lower track 16.

Movement of the bell crank 24 to elevate the tracks is shown as provided by an actuating means such as a lift power means 40. This power means 40 comprises an electric motor 40a and a housing forming a gear box 40b which is pinned to ears 41 upstanding from the base plate 30 by the pin 40c. The power means 40 further includes a screw actuator apparatus indicated generally at 40d and including a screw shaft 40e rotatably driven by the motor 40a through the gear box 40b. Selective length adjustment of the screw actuator apparatus 40d effects movement of a connecting rod 42 suitably pinned to a crank arm 44 radially extending from a transversely extending rod such as a torque rod 46 shown eccentrically carried by the bell crank arms 32 of the bell cranks 24 at either side of the seat. The rod 46 is non-rotatably affixed to the bell crank arms 32. Thus torque applied to rod 46 by the power source 40 causes the rod 46 to revolve in a circular orbital movement about the bell crank pivot 26 turning the bell crank 24 and lifting the front portion of the track.

The other arm 48 of the bell crank 24 provides means for connecting and operatively interrelating the mechanism for effecting vertical movement of the front portion of lower track-way 16 with a rearward support mechanism.

The floor bracket 30 is provided with an upstanding ear 50. To this ear 50 is pivoted as by pivot pin 52 a yoke or cradle means such as the generally U-shaped bracket means 54. The rotatable bracket 54 also serves in a tilt action capacity, but it is here considered merely in its supporting capacity.

Pivoted to the bracket 54 as by pivot 56 is an arm 58 of movable means such as a rotatable rear bell crank 60. The bell crank pivot axis 56 is spaced from the bracket pivot axis 52 to permit the bracket 54 to provide a variable location of the axis 56 of the bell crank 60, when bracket 54 is swung to effectuate tilt-control.

The bell crank 60 is shown as supporting the lower track 16 by a laterally extending supporting arm 62 which carries a roller 64 received in a bearing 66 carried by the lower track 16. To accommodate the longitudinal component of the motion of the lateral supporting arm 62 as it is moved in seat-movement-controlling operation, that bearing 66 of the track which received the roller 64 is longitudinally elongated.

For controlling movement of the bell crank 60 in the operation of controlling the seat disposition, the bell crank 60 has an arm 68 pivoted as by pivot 70 to a connecting link 72 which extends forwardly to the front bell crank 24 at a pivot pin 74 to provide an interrelation of the movement of the front and rear bell cranks 24—60. Thus as shown the connecting link 72 links arm 68 of the rear bell crank 60 to the arm 48 (by pin 74) of the bell crank 24 of the front actuating mechanism.

During an application of lifting effort by the lift or elevation motor means 40, the front torque rod 46 is acted upon to effect a forward swinging of arm 48 of front bell crank 24. During upward movement of the bell crank arm 32 the rod 46 causes the front portion of the seat-supporting track 16 to be moved upwardly. Since connecting link 72 is pinned to arm 48 of the front bell crank 24, upon such forward movement of arm 48 the connecting link 72 will be pulled forwardly, thereby pulling forwardly on the pin 70 and on the arm 68 of the rear bell crank 60. Since the bracket 54 is being held against swinging by tilt-control means, the axis of pivot 56 is fixed. To accommodate forward movement of the arm 68, therefore the bell crank 60 is forced to pivot about its pivot pin 56. Such pivotal movement of bell crank 60 causes the lateral arm 62 projecting outwardly therefrom to raise the rear portion of the seat-supporting track 16.

Thus, seat-elevation movement effected by the seat-lifting means 40 to cause either a raising or lowering of the front portion of the seat-supporting track 16 operates through the front and rear bell cranks 24—60 which are operatively interrelated to effectuate a corresponding elevational movement of the rear portion of the seat supporting track.

To provide for seat tilt according to the embodiment of the invention here illustrated, means are provided to act on the bracket 54 to cause the rear end of the seat track 16 to be raised or lowered with respect to the forward end of the seat track. As shown, such means operate to effect movement of the axis of pin 56 by which the bracket 54 rotatably supports the rear bell crank 60. The seat-tilt means shown includes a rear transversely extending member such as a torque rod 76 non-rotatably connected to bracket 54 of the supporting structure at each side of the seat. The rear torque rod extends transversely of the seat coaxially with respect to the axis 52 by which the brackets 54 are pinned to the supporting ears 50 of the floor-supports 30. For so securing torque rod 76 to brackets 54, cross-pins 78 are connected to stub shafts 80 welded as by welds 82 to the interior walls of the brackets 54 co-axially with the axis of pivot pins 52. An arm 84 is welded or otherwise non-rotatably fixed to the torque rod 76 to provide a crank therefor adapted to receive power from an associated actuating means such as tilt-movement power source 86. The tilt power source 86, like the lift power source 40, includes an electric motor 86a having a gear box 86b to drivingly actuate a screw actuator 86c including a rotatable screw 86d, thereby to effect movement of the arm 84 upon selective length adjustment of the actuator 86c in response to rotation of the screw 86d.

Thus, in the embodiment shown, seat-tilting movement is effected by energizing the tilt movement power source 86 to rotate rear torque rod 76 and its connected brackets 54 about the common axis of torque rod 76 and bracket pivot 52. This rotation of bracket 54 at each side of the seat causes the pin 56 carried thereby to swing about that common axis 52—76, and consequently produces a corresponding movement of the arm 58 of the rear bell crank 60, that arm 58 being pivoted on pin 56.

The other arm 68 of rear bell crank 60 is not wholly free to move, but instead is restrained by the pin 70. That pin 70 in turn is restrained by connecting link 72 to move only about the axis of pin 74 of the front bell crank 24, which bell crank 24 is fixed due to inaction of the elevating means 40. Such possible path of pin 70 about pin 74 is of course not coincident with any path concentric about the lateral arm 62 of the bell crank 60. Thus, as the tilt power means causes bracket 54 to rotate to translate the axis of pin 56 and thus rotate bell crank arm 58, the pin 70 cannot merely rotate about the axis of the laterally projecting arm 62, which would give no translation of that arm 62 and consequently give no effect with respect to seat tilt; instead, pin 70 is forced to move in a path concentric about pin 74 at the front end of the connecting link 72, and the entire bell crank 60 is of course forced to move in accord. It may be noted that the movement of bell crank 60 is translational with its point 56 rotating about the floor-bracket pin 52 and its point 70 rotating about the front bell crank pin 74, and with its other points following an irregular translatory path. The supporting arm 62 is likewise caused to translate, inasmuch as it is connected to the bell crank 60; and the motion of arm 62 is of course imparted to the rear portion of the supporting track 16 by the arm-receiving bearing 66 carried by the track 16. The horizontal component of such movement of arm 62 is accommodated by the elongated extent of that bearing 66, and the vertical component of such motion of arm 62 provides the seat tilt desired.

Desirably a heavy spring 87 is provided to extend between an ear 87a of floor bracket 30 to the pin 70 of the rear bell crank 60. This takes up lost motion and prevents rattle, and also helps to raise the load.

While we have described the seat tilt structure and operation of the illustrated embodiment in an operation in which the seat-elevating means 40 was inactive during seat-tilt, it will be understood that the seat-elevating means and the seat-tilt means may be operated concurrently. In fact, the seat-elevating means and the seat-tilt means may be operated concurrently not only with each other but with seat extension actuation means now to be described by which the seat may be selectively moved generally horizontally forwardly or rearwardly with respect to the floor.

In the embodiment illustrated, for effecting the desired fore-and-aft horizontal seat-extension of the seat 10, a horizontal movement power means 88 is secured to the vehicle floor as by a pin 90 held by upstanding ears 92 of the floor bracket 30. The power means 88 includes an electric motor 88a having a gear box 88b drivingly connected to a screw actuator 88c which includes a screw 88d, thereby to effect movement of the sleeve member 94 in response to selective length adjustment of the actuator 88c upon rotation of the screw 88d. The relatively extendible portion 94 of the power means 88 is connected as by pin 96 to a bracket 98 secured to the seat frame 12. Thus energization of the horizontal power means acts to longitudinally force the seat frame 12 and seat 10 forwardly or rearwardly as desired, with the fore-and-aft movement accommodated by relative longitudinal movement of the upper trackways 14 along the lower trackways 16.

In further accordance with this embodiment of the present invention means are provided to support the tilt power means 86 and yet avoid the necessity of a mounting bracket attached to the floor of the vehicle. Thus there is provided a supporting bracket or carrier such as a sling 100, shown as a longitudinally extending bracket-like supporting member. The tilt power means 86 is supported by the sling 100, and is shown as fastened thereto as by a pin 102 extending through ears 104 upstanding from the sling 100.

The sling 100 is supported by the front torque rod 46 and by the rear torque rod 76. More specifically, in the embodiment shown, to avoid the effects of the orbital or translatory revolution movement of the front torque rod 46 (which revolves about the axis of pin 26) the sling 100 is supported from front torque rod 46 by having a forward and upwardly projecting portion 106 of the sling 100 pivoted as by a pivot pin 108 to a crank arm 110 fixed as by welding to rod 46 and extending radially therefrom to provide that the pivot 108 is co-axial with respect to the pivot 26. The bearing 112 of the sling 100 which receives pivot pin 108 may be desirably elongated somewhat as shown to permit wider tolerances. The rear portion of sling 100 is provided with a bearing 114 which loosely receives the rear torque rod 76 and is supported thereby.

The sling 100 thus always maintains the same position relative to the car floor no matter how the seat is moved; for it will be remembered that the rear torque rod 76 does not translate but rather rotates about its own axis since it is co-axial with the pivot 52 by which the supporting bracket 54 and the rear rod 76 are pivotally supported to the floor bracket 30. Moreover, as has been just described, the pivot 108 by which the front portion 106 of the bracket sling 100 is carried is co-axial with the floor bracket pivot 26 about which the front torque rod 46 and crank arm 110 rotate, and thus the crank arm pivot 108 does not translate.

It will thus be seen from the foregoing description of our invention according to a preferred embodiment, considered in conjunction with the accompanying drawings, that the present invention provides a new and improved seat-adjustment device having desired advantages and characteristics, and accomplishing its intended objects, including those hereinbefore pointed out and others which are inherent in the invention as described.

It will be understood that modifications and variations may be effected without departing from the scope of the novel concepts of the present invention.

We claim as our invention:

1. A seat construction in which a seat is adjustably supported from an associated base structure, comprising a seat frame, supporting means including a pair of laterally spaced supporting members, means relatively slidably supported by said members for supporting said seat frame for controlled fore and aft movement with respect to said supporting members, front and rear means connected to the base structure and supporting the associated supporting member at each side of said seat and including a front bell crank means and a rear bell crank means and a connecting link means interconnecting said bell crank means, means for imparting a controlled rotation to said first bell crank means for effecting a controlled elevational adjustment to said associated supporting member with respect to said base structure, a supporting bracket means for pivotally supporting said rear bell crank means about an axis, said supporting bracket means being pivotally supported by said base structure and adapted to swing with respect thereto to change the location of said axis of said rear bell crank means, and actuating means for causing said bracket means to so swing.

2. A seat construction in which a seat is adjustably supported from an associated base structure, comprising a seat frame, supporting means including a pair of laterally spaced supporting members, means relatively slidably supported by said members for supporting said seat frame for controlled fore and aft movement with respect to said supporting members, means supporting said supporting members from said base structure and including operatively interconnected longitudinally spaced supporting means relatively movable to effect a controlled variation in elevation of said seat frame with respect to said base structure, cradle means for supporting one of said spaced means and movable to vary its elevation with respect both to the base structure and to the other of said spaced means to effect a controlled variation of tilt of said seat frame.

3. A seat construction in which a seat is adjustably supported from an associated base structure, comprising a supporting system including a laterally spaced first pair of supporting means and a first transversely extending member extending therebetween and guided for circular orbital movement about a transverse axis, means revolvable with said transversely extending member extending radially thereof and carrying pivot means generally concentric with said axis of circular orbital movement, a second pair of laterally spaced supporting means for said seat frame and including a second transversely extending member extending therebetween, power means operative to adjust the position of said seat frame with respect to said base structure, and a supporting sling means for supporting said power means, a portion of said sling means being supported by said second transversely extending member, and another portion of said sling means being supported by said pivot means.

4. A seat construction in which a seat is adjustably supported from an associated base structure, comprising a seat frame, relatively longitudinally spaced supporting means, a first of said spaced supporting means including a transversely extending member eccentrically carried for revolving movement to provide for adjustment of the elevation of said seat frame, an arm means secured to said member and providing pivot means generally concentric with the axis about which said member revolves, and a sling means including a pivot means co-operating with the pivot means of said arm member to support said sling means, and actuating means for effecting adjustment of said seat frame with respect to said base structure, said actuating means being supported by said sling means.

5. An adjustable seat comprising a generally horizontal seat frame having front and rear end portions, a bell crank member having a knee portion and a first and second angularly offset arm portion, a floor bracket, a lever bracket having a pair of spaced apart pivots, a pivotal connection between one of said pivots and one end of said floor bracket, a pivotal connection between one of said arm portions of said bell crank member and the other of said pivots on said lever bracket, a pivotal connection between said knee portion and one end portion of said seat frame, means to selectively pivotally displace said lever bracket on an axis through said one of said pivots, and means to confine the other arm portion of said bell crank lever, thereby to effect selective tilting of one end portion of said seat frame.

6. A tiltably adjustable seat as defined in claim 5, said means confining the other arm portion of said bell crank lever comprising a selectively movable second bell crank member having a knee portion pivotally connected to the other end of said floor bracket, a first arm portion on said second bell crank member pivotally connected to the other end portion of said seat frame, and a second arm portion on said second bell crank member having a link connection with said other arm portion, and means to selectively swing said second bell crank member around the pivot axis of said knee portion, thereby to effect platform lift of said seat frame.

7. A tiltably adjustable seat comprising a generally horizontally extending movable seat bracket having front and rear end portions, a stationary floor bracket, a movable bracket member pivotally connected to said stationary floor bracket at one end thereof, a bell crank lever having a knee portion and angularly offset arm portions, a first pivoted connection between one arm portion of said bell crank lever and said movable bracket, a connection between said knee portion of said bell crank lever and one end of said seat bracket, power-driven actuating means having a driving connection with the movable bracket to swing said one end portion of said seat bracket through a generally vertical plane of movement, and connecting means between the other arm portion of said bell crank lever and said floor bracket confining said other arm of said bell crank lever against relative movement to effect tilting operation of the seat bracket.

8. A tiltably adjustable seat as defined in claim 7, said connecting means including a second bell crank lever having a knee portion and first and second angularly offset arm portions, a first pivot connection between said first arm portion and the other end portion of said seat bracket, a second pivot connection between the knee portion of said second bell crank lever and said floor bracket, a third pivot connection between said second arm portion and one end of a link having its opposite end connected to the said other arm portion of the first bell crank lever, and a separate power-driven actuating means to rotate said second bell crank lever, thereby to effect elevational adjustment of both ends of said seat bracket.

References Cited in the file of this patent
UNITED STATES PATENTS

| | | |
|---|---|---|
| 2,594,882 | De Rose | Apr. 29, 1952 |
| 2,609,029 | Haberstump | Sept. 2, 1952 |
| 2,707,137 | Hollstein | Apr. 26, 1955 |